(12) United States Patent
Zhao et al.

(10) Patent No.: US 8,139,293 B2
(45) Date of Patent: Mar. 20, 2012

(54) PROJECTION LENS WITH HIGH RESOLUTION AND REDUCED OVERALL LENGTH

(75) Inventors: Yuan Zhao, Guangdong (CN);
Chang-Qing Wu, Guangdong (CN);
Yang-Cheng Luo, Guangdong (CN)

(73) Assignees: Premier Image Technology(China) Ltd., Foshan, Guangdong Province (CN); Hon Hai Precision Industry Co., Ltd., Tu-Cheng, New Taipeki (TW)

( * ) Notice: Subject to any disclaimer, the term of this patent is extended or adjusted under 35 U.S.C. 154(b) by 62 days.

(21) Appl. No.: 12/759,642

(22) Filed: Apr. 13, 2010

(65) Prior Publication Data

US 2011/0170201 A1   Jul. 14, 2011

(30) Foreign Application Priority Data

Jan. 14, 2010   (CN) .......................... 2010 1 0300312

(51) Int. Cl.
*G02B 15/14*   (2006.01)

(52) U.S. Cl. ....................................... 359/682; 359/680

(58) Field of Classification Search .................. 359/680, 359/681, 682

See application file for complete search history.

(56) References Cited

U.S. PATENT DOCUMENTS

| | | | | |
|---|---|---|---|---|
| 7,038,857 B1 * | 5/2006 | Kuo | ............................... | 359/680 |
| 7,466,494 B2 * | 12/2008 | Kuo | ............................... | 359/680 |
| 7,580,194 B2 * | 8/2009 | Lin | ............................... | 359/649 |
| 7,742,243 B2 * | 6/2010 | Lin | ............................... | 359/793 |
| 7,944,620 B2 * | 5/2011 | Wang et al. | .................... | 359/682 |
| 8,000,023 B2 * | 8/2011 | Chou et al. | .................... | 359/680 |

FOREIGN PATENT DOCUMENTS

CN   1892277 A   1/2007

* cited by examiner

*Primary Examiner* — David N Spector
(74) *Attorney, Agent, or Firm* — Altis Law Group, Inc.

(57) ABSTRACT

An zoom projection lens includes, in this order from the screen-side to the SLM-side thereof, a negative lens group and a positive lens group, and satisfies: $-2<\Phi 1/\Phi 2<-0.5$, $-2<EFL1/EFL(W)<-1.5$, $1.5<EFL2/EFL(W)<1.75$, $-1.2<EFL1/EFL(T)<-1$, $0.8<EFL2/EFL(T)<1.2$, $0.5<EFL(W)/BFL(W)<0.6$, $0.68<EFL(T)/BFL(T)<0.75$, $6.2<TTL(W)/EFL(W)<6.5$, and $3.5<TTL(T)/EFL(T)<3.6$; where $\Phi 1$ and $\Phi 2$ represent refractive powers of the negative lens group and the positive lens group respectively, EFL(W), EFL(T), EFL1 and EFL2 represent effective focal lengths of the projection lens in a wide-angle state and in a telephoto state, the negative lens group, and the positive lens group respectively, TTL(W) and TTL(T) represent overall lengths of the projection lens in the wide-angle state and in the telephoto state respectively, and BFL(W) and BFL(T) represent rear focal lengths of the projection lens in the wide-angle state and in the telephoto state respectively.

8 Claims, 26 Drawing Sheets

PROJECTION LENS WITH HIGH RESOLUTION AND REDUCED OVERALL LENGTH

BACKGROUND

1. Technical Field

The disclosure relates to lenses and, particularly, to a projection lens having a high resolution and a reduced length.

2. Description of Related Art

To obtain a sharp projection image and reduced size of projectors, projection lenses with high resolution but short overall length are needed. However, factors affecting both the resolution and the overall length of the projection lens, such as the number, position, and refractive power distribution of lenses employed, complicate any attempt at increasing resolution and shortening overall length of projection lenses.

Therefore, it is desirable to provide a projection lens, which can overcome the problems mentioned above.

BRIEF DESCRIPTION OF THE DRAWINGS

Many aspects of the present projection lens should be better understood with reference to the following drawings. The components in the drawings are not necessarily drawn to scale, the emphasis instead being placed upon clearly illustrating the principles of the present projection lens. Moreover, in the drawings, like reference numerals designate corresponding parts throughout the several views.

DETAILED DESCRIPTION

Embodiments of the present projection lens will now be described in detail with reference to the drawings.

Figure 1:
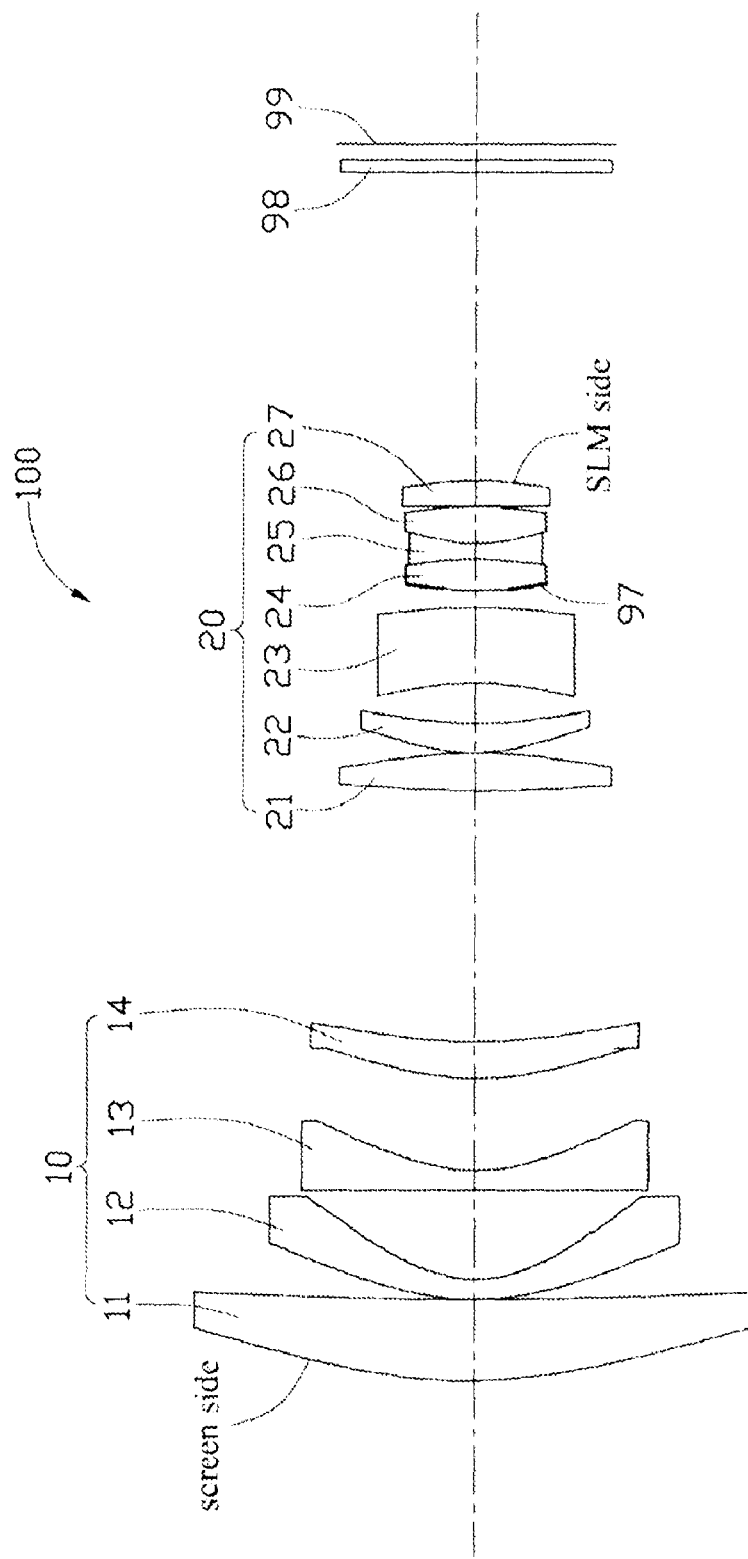
FIG. 1 is a schematic view of a projection lens that is in a wide-angle state, according to a first embodiment.
Figure 2:
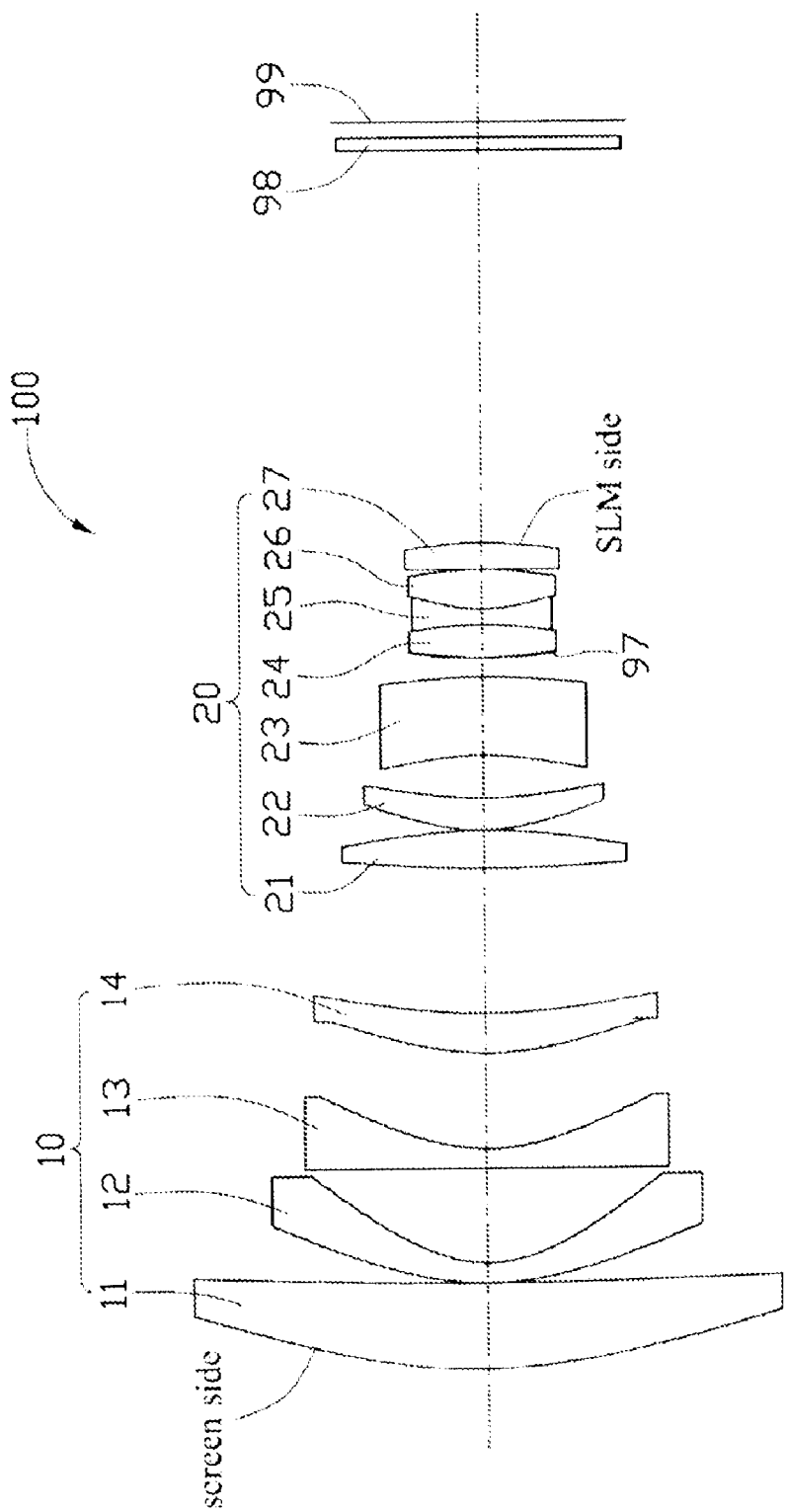
FIG. 2 is a schematic view of a projection lens that is in a telephoto state, according to the first embodiment.

Referring to FIGS. 1-2, a projection lens 100, according to a first exemplary embodiment, is for use in a projector (not shown), for example, a digital light processing (DLP) projectors, a liquid crystal display (LCD) projector, or a liquid crystal on silicon (LCoS) projector, and is configured for projecting an image from a spatial light modulator (SLM) (not shown), such as, a digital micro-mirror device (DMD), an LCD panel, or an LCoS panel, to a screen (not shown). In this embodiment, the projection lens 100 is used in a DLP projector. The DLP projector is commonly equipped with a DMD that has a surface 99 facing the projection lens 100.

The projection lens 100 includes, in this order from a screen-side to the SLM-side, a negative lens group 10 and a positive lens group 20.

The lens groups 10 and 20 can slide along the optical axis of the projection lens 100. Depending on the user needs, these lens groups can slide towards (telephoto FIG. 2) or away (wide-angle FIG. 1) from each other affecting the focal length of the projection lens.

The projection lens 100 satisfies the formulas of: (1) $-2<\Phi1/\Phi2<-0.5$, (2) $-2<EFL1/EFL(W)<-1.5$, (3) $1.5<EFL2/EFL(W)<1.75$, (4) $-1.2<EFL1/EFL(T)<-1$, (5) $0.8<EFL2/EFL(T)<1.2$, (6) $0.5<EFL(W)/BFL(W)<0.6$, (7) $0.68<EFL(T)/BFL(T)<0.75$, (8) $6.2<TTL(W)/EFL(W)<6.5$, and (9) $3.5<TTL(T)/EFL(T)<3.6$; where $\Phi1$ and $\Phi2$ represent refractive powers of the negative lens group 10 and the positive lens group 20 respectively, EFL(W) and EFL(T) represent effective focal lengths of the projection lens 100 when the projection lens 100 is in the wide-angle state and in the telephoto state respectively, EFL1 and EFL2 represent effective focal lengths of the negative lens group 10 and the positive lens group 20 respectively, TTL(W) and TTL(T) represent overall lengths (i.e., a distance from the screen-side surface of the projection lens 100 to the screen 99) of the projection lens 100 when the projection lens 100 is in the wide-angle state and in the telephoto state respectively, and BFL(W) and BFL(T) represent rear focal lengths of the projection lens 100 when the projection lens 100 is in the wide-angle state and in the telephoto state respectively.

The formula (1) is configured to obtain a high zoom ratio of the projection lens 100. The formulas (2) and (3) are adapted to obtaining a wide field angle of the projection lens 100. The formulas (4) and (5) are configured for increasing a size of a projection image on the screen when the projection lens 100 is in the telephoto state. The formulas (6) and (7) are adapted for correcting aberrations occurring in the projection lens 100. The formula (8) is for limiting the overall length of the projection lens within an acceptable range.

Specifically, the negative lens group 10 includes, in this order from the screen-side to the SLM-side of the projection lens 100, a positive first lens 11, a negative second lens 12, a negative third lens 13, and a positive fourth lens 14.

The positive lens group 20 includes, in this order from the screen-side to the SLM-side of the projection lens 100, a positive fifth lens 21, a positive sixth lens 22, a negative seventh lens 23, a positive eighth lens 24, and a positive ninth lens 25, a positive tenth lens 26, and a positive eleventh lens 27, wherein the eighth lens 24 and the ninth lens 25 are combined.

More specifically, the projection lens 100 further includes an aperture stop 97. The aperture stop 97 is interposed between the seventh lens 23 and the eighth lens 24 to block off-axis light rays from the eighth lens 24 entering the seventh lens 23, and thereby prevents too much distortion occurring in the projection lens 100. In this embodiment, aperture stop 97 is an opaque layer deposited on the eighth lens 24.

Detailed examples of the projection lens 100 are given below in company with FIGS. 3-26, but it should be noted that the projection lens 100 is not limited to these examples. Listed below are the symbols used in these detailed examples:

$F_{No}$: F number;
$2\omega$: field angle;
R: radius of curvature;

D: distance between surfaces on the optical axis of the projection lens 100;
Nd: refractive index of lens; and
V: Abbe constant.

When projecting an image, the image is modulated by the DMD, and projects from the surface 99, transmits through a cover glass 98 that is set for protection of the DMD, the projection lens 100, and finally projects onto a screen (not shown).

EXAMPLE 1

Table 1 shows the lens data of Example 1, where EFL(W)=15.9 (millimeter, mm), EFL(T)=25.44 mm, $F_{No}$=2.6(W)~3.4(T) (representing that $F_{NO}$ is about 2.6 when the projection lens 100 is in the wide-angle state and is about 3.4 when the projection lens 100 is in the telephoto state), EFL1=−28.88 mm, EFL2=25.67 mm, (Φ1=−0.035, Φ2=0.039, BFL(W)=27.16 mm, BFL(T)=35.84 mm, TTI(W)=100 mm, and TTI(T)=91.25 mm. As such, Φ1/Φ2=−0.88, EFL1/EFL(W)=−1.82, EFL2/EFL(W)=1.61, EFL1/EFL(T)=−1.14, EFL2/EFL(T)=1.00, EFL(W)/BFL(W)=0.585, EFL(T)/BFL(T)=0.70, TTI(W)/EFL(W)=6.28, and TTI(T)/EFL(T)=3.59.

Figure 3:
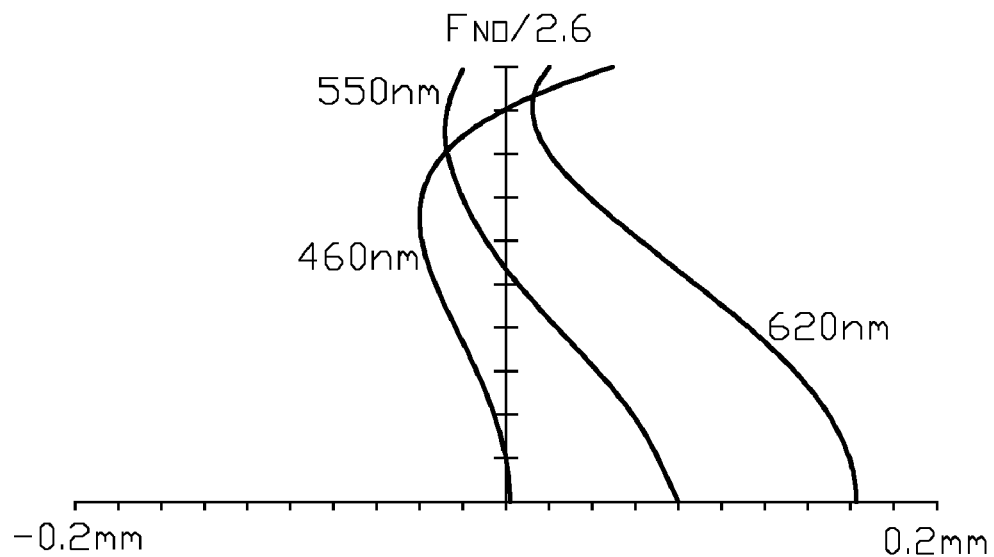
FIGS. 3-6 are graphs respectively showing spherical aberration, field curvature, distortion, and lateral chromatic aberration occurring in the projection lens in the wide-angle state as in FIG. 1, according to a second embodiment.
Figure 4:
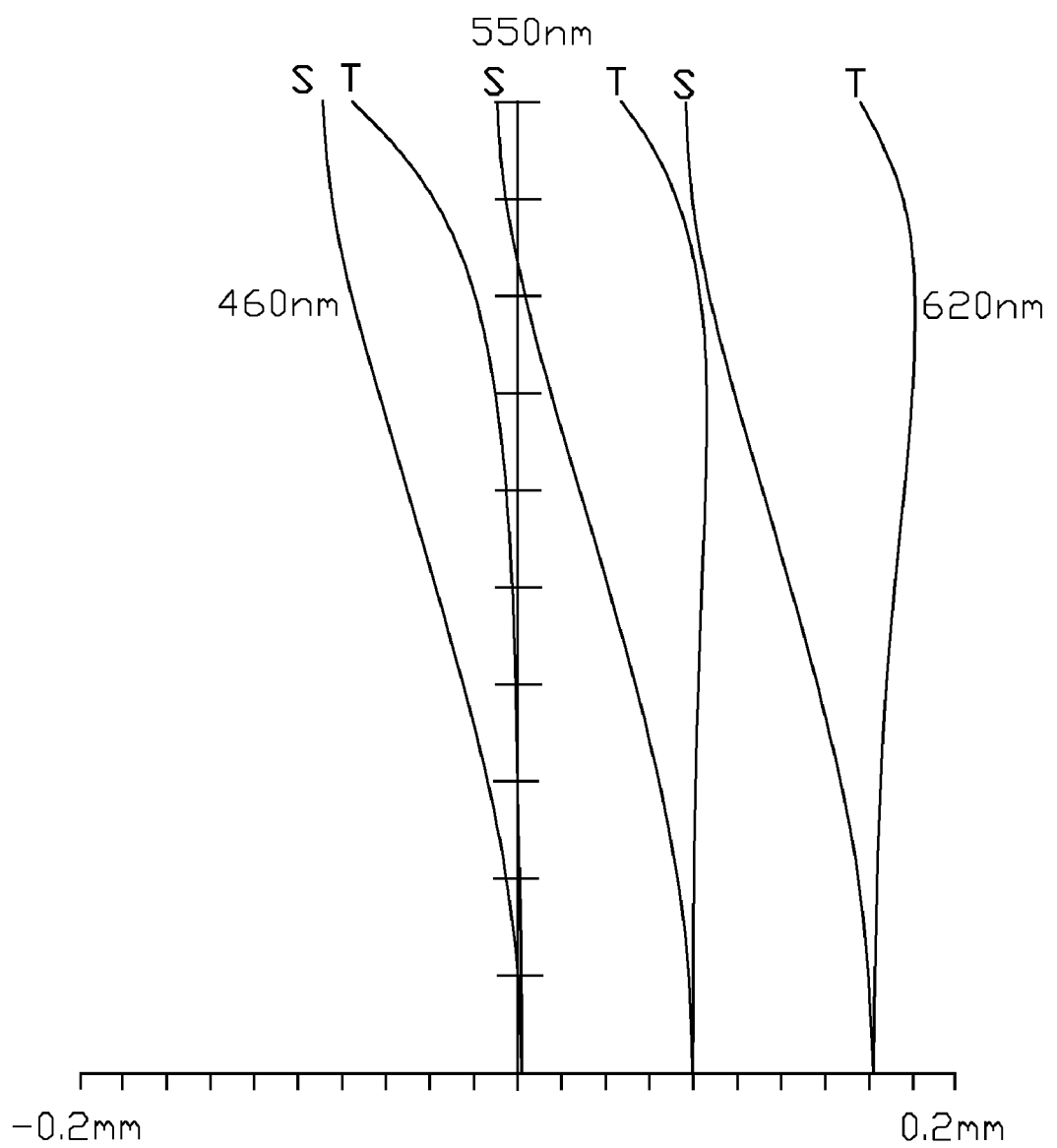
Figure 5:
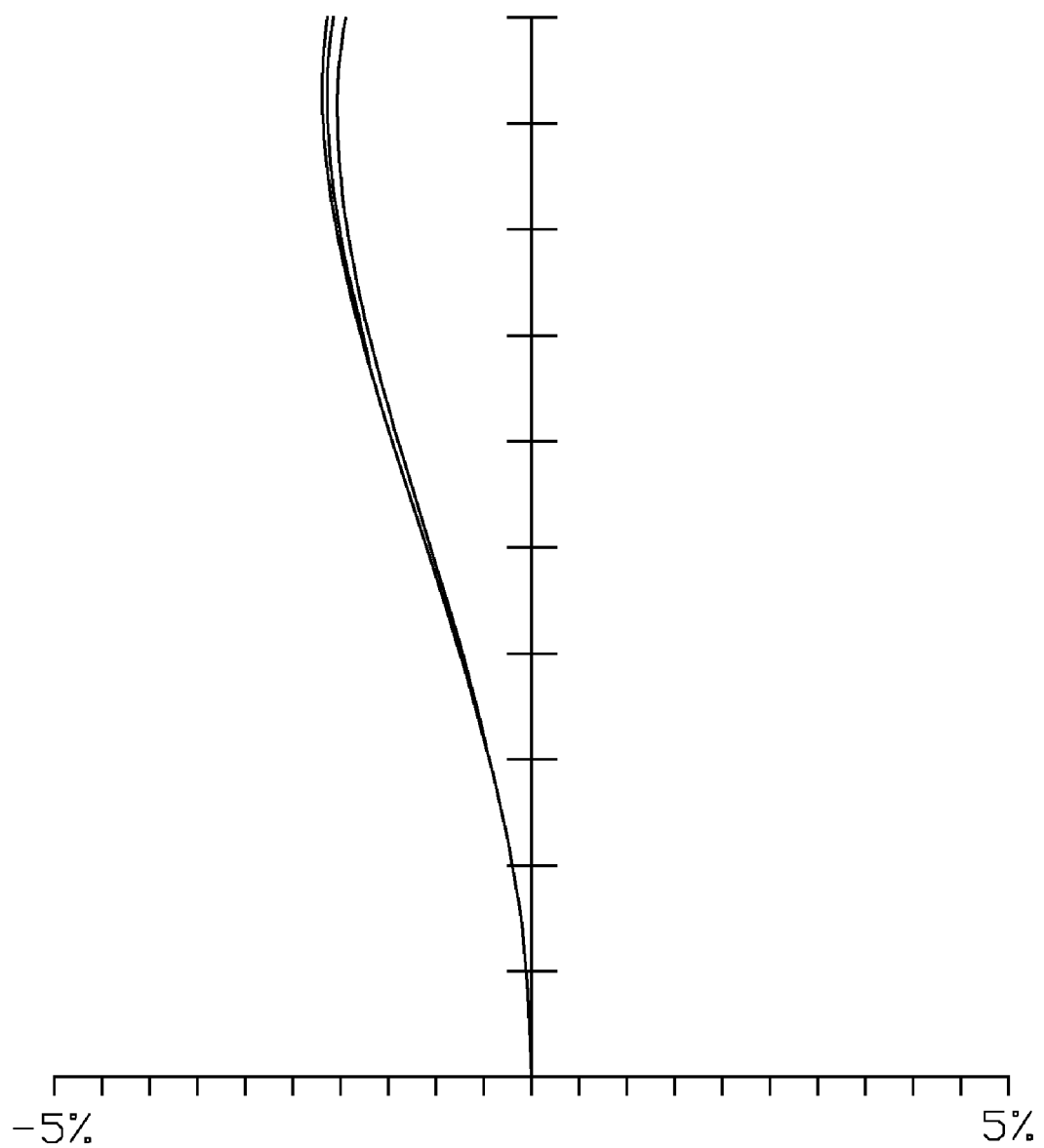
Figure 6:
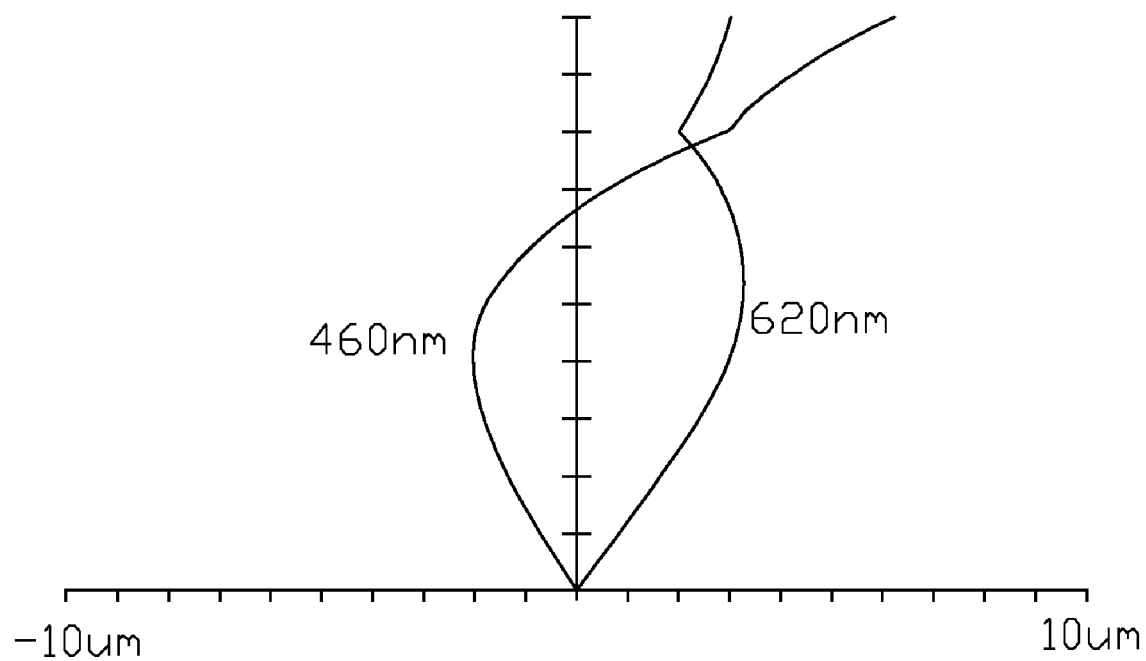
Figure 7:
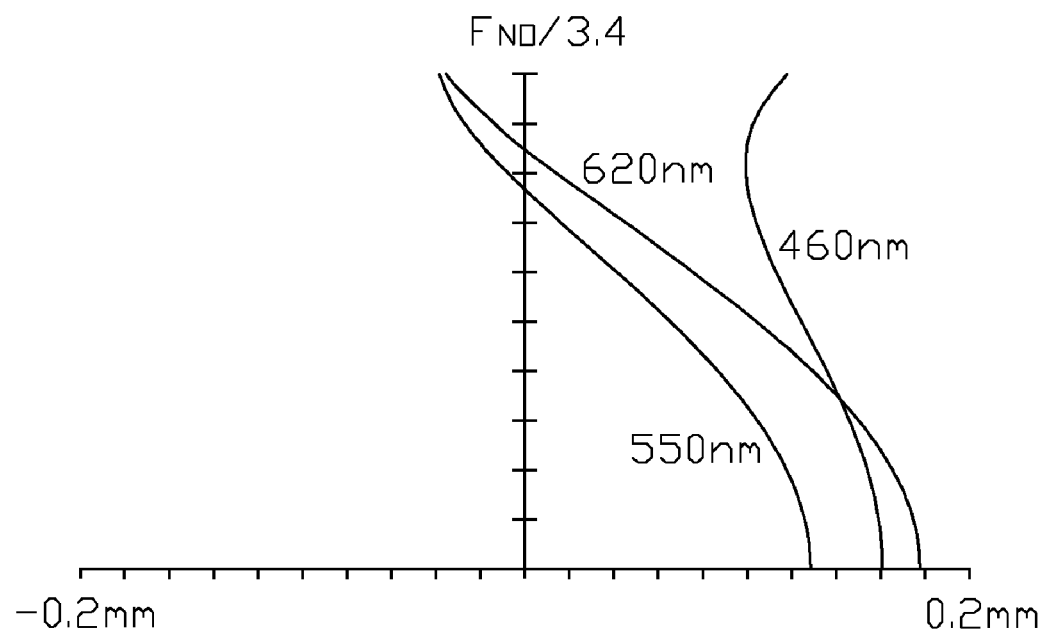
FIGS. 7-10 are graphs respectively showing spherical aberration, field curvature, distortion, and lateral chromatic aberration occurring in the projection lens in the telephoto state as in FIG. 2, according to the second embodiment.
Figure 8:
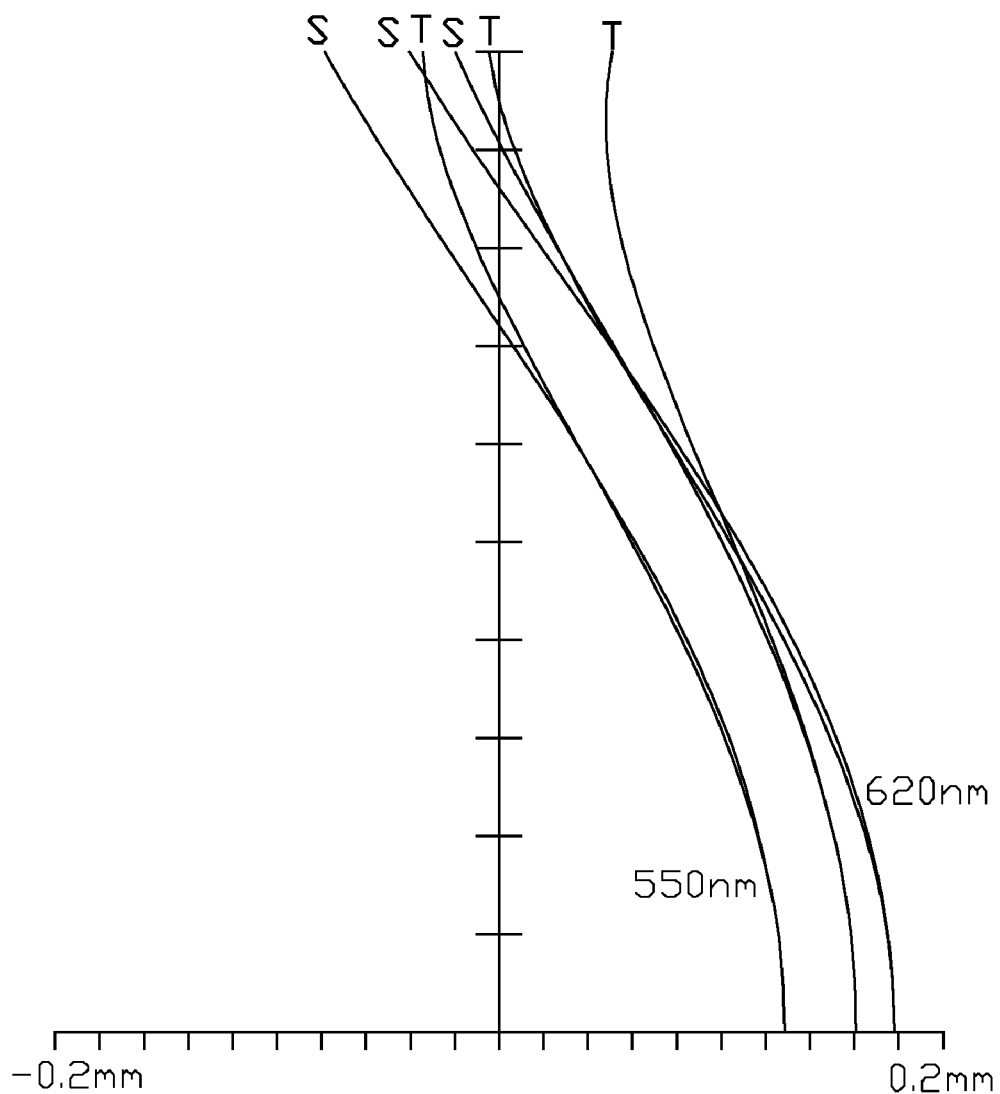
Figure 9:
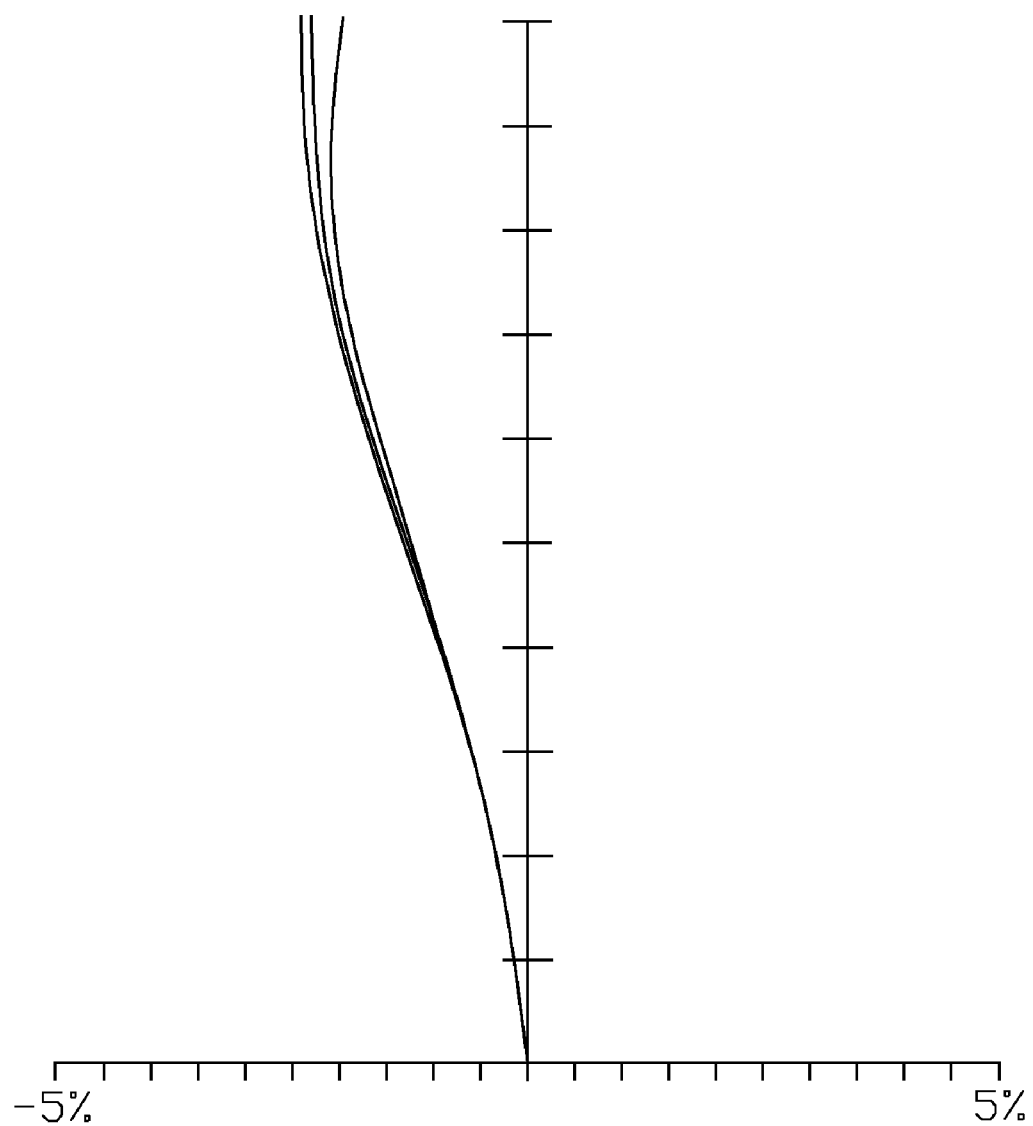
Figure 10:
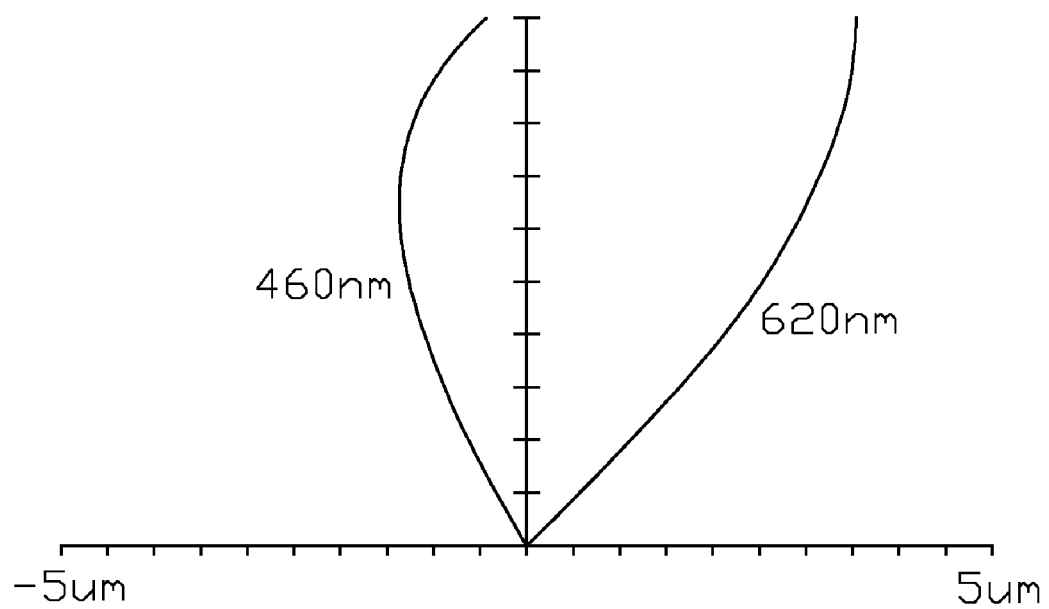
Figure 11:
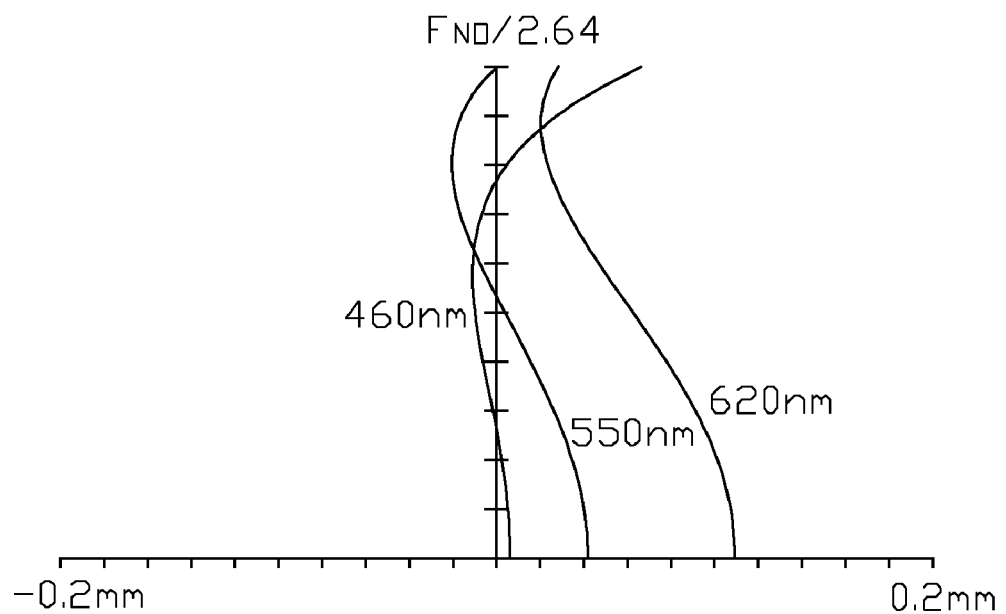
FIGS. 11-14 are graphs respectively showing spherical aberration, field curvature, distortion, and lateral chromatic aberration occurring in the projection lens that is in the wide-angle state as in FIG. 1, according to a third embodiment.
Figure 12:
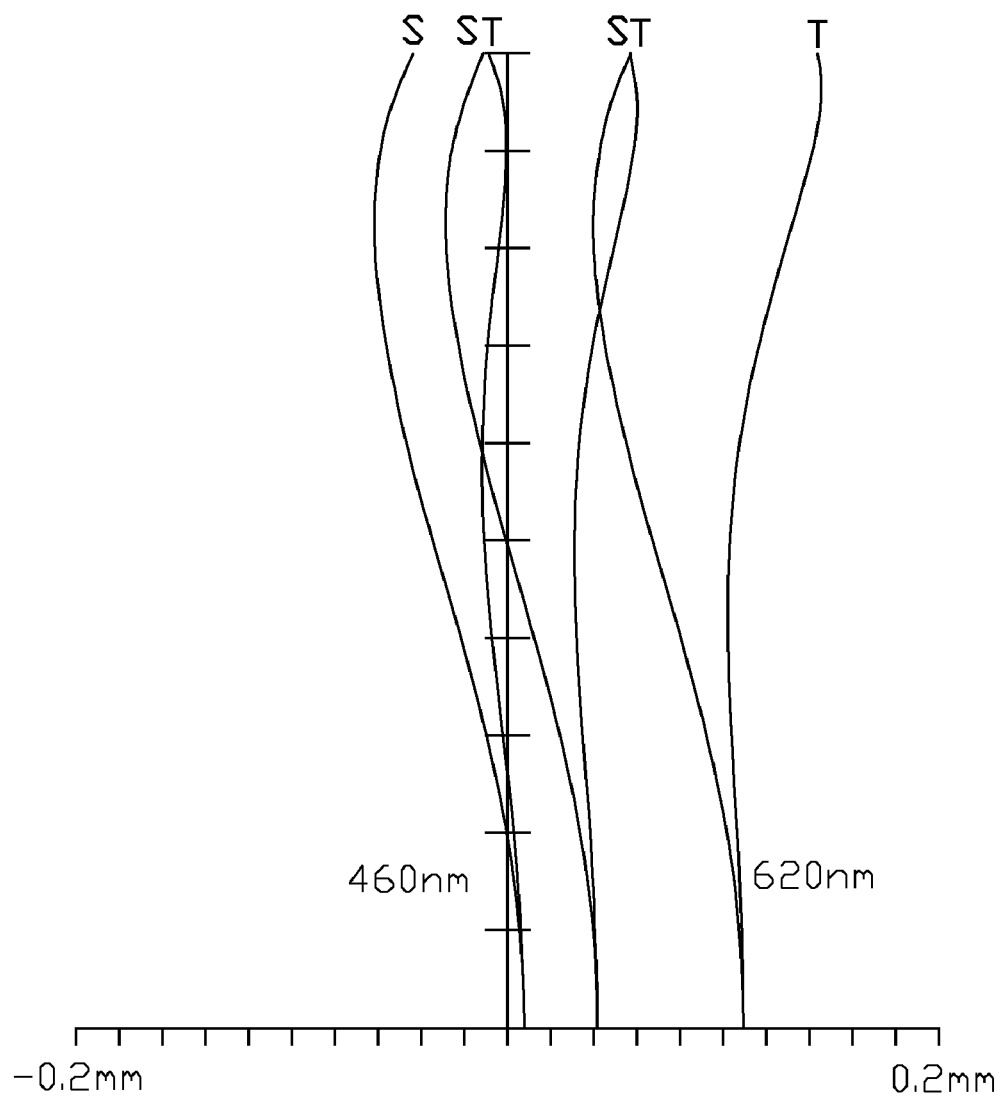
Figure 13:
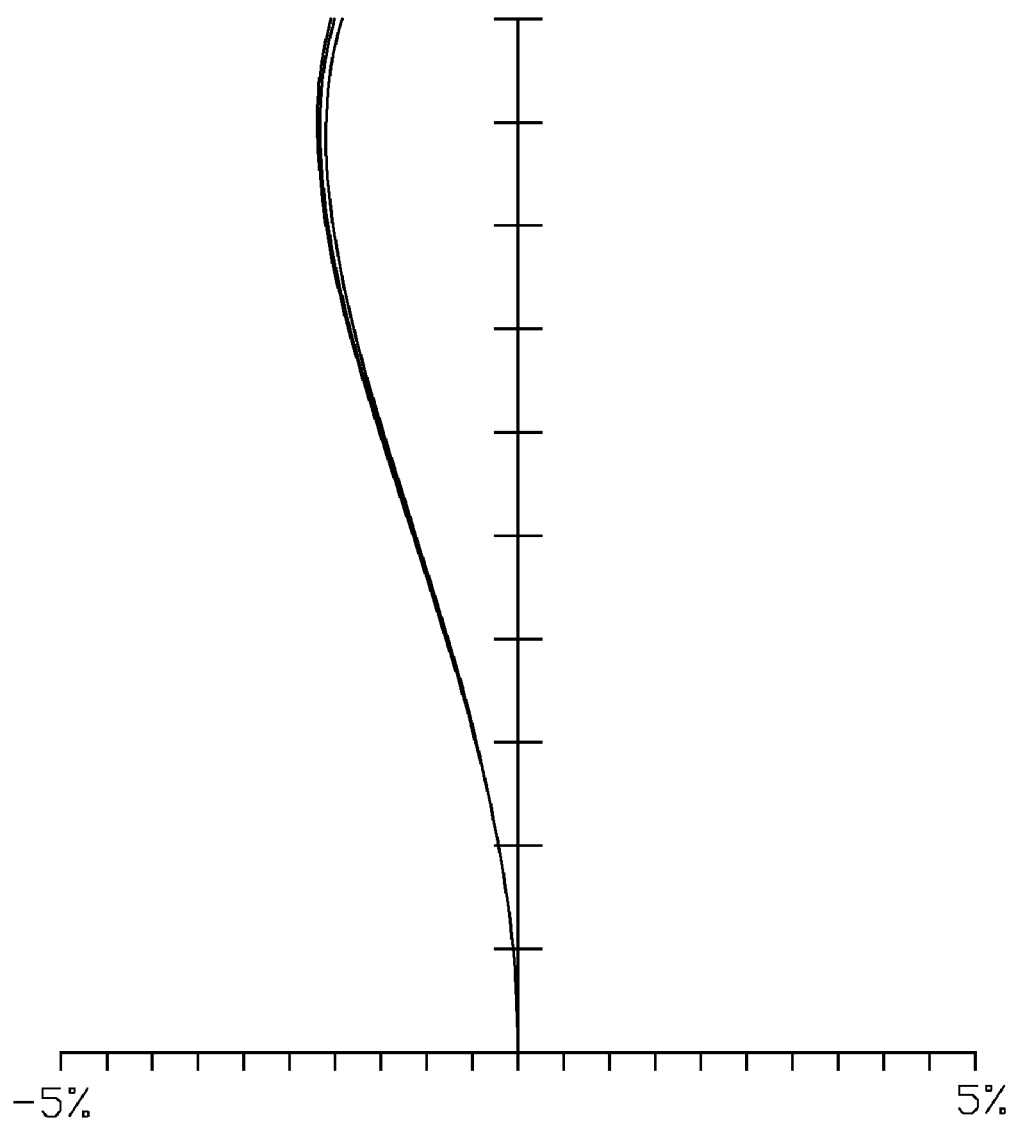
Figure 14:
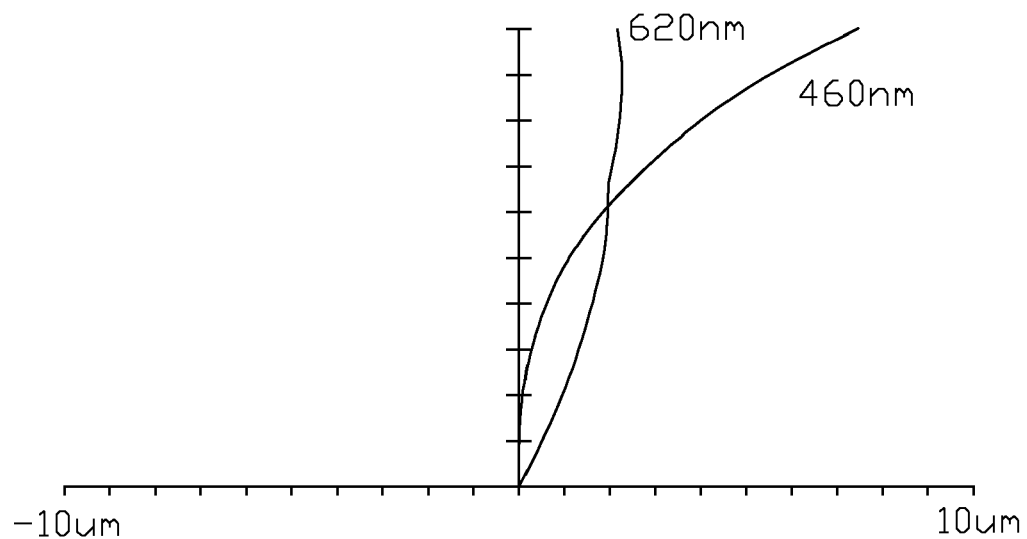
Figure 15:
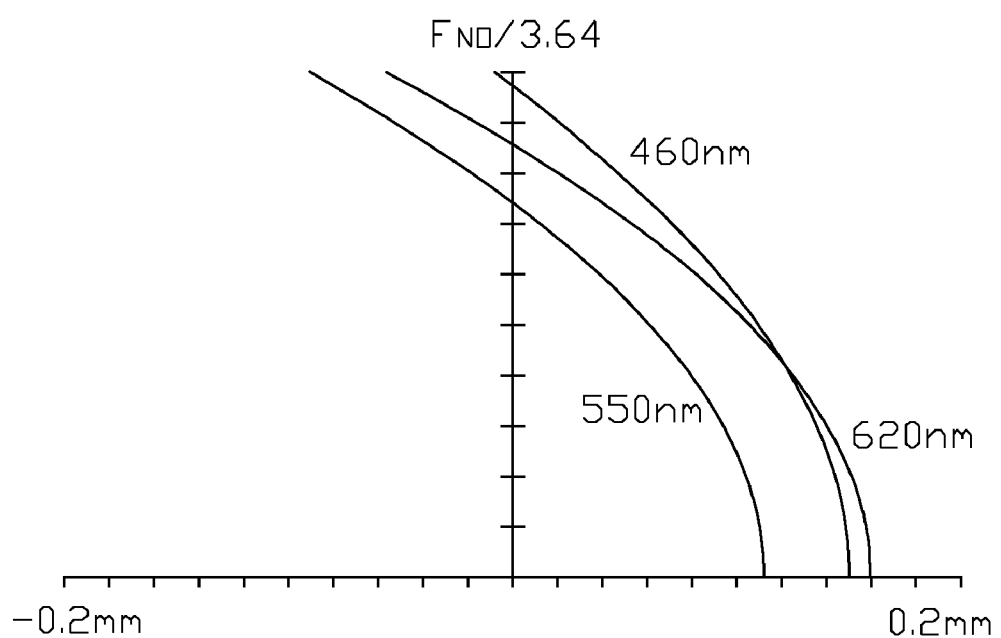
FIGS. 15-18 are graphs respectively showing spherical aberration, field curvature, distortion, and lateral chromatic aberration occurring in the projection lens in the telephoto state as in FIG. 2, according to the third embodiment.
Figure 16:
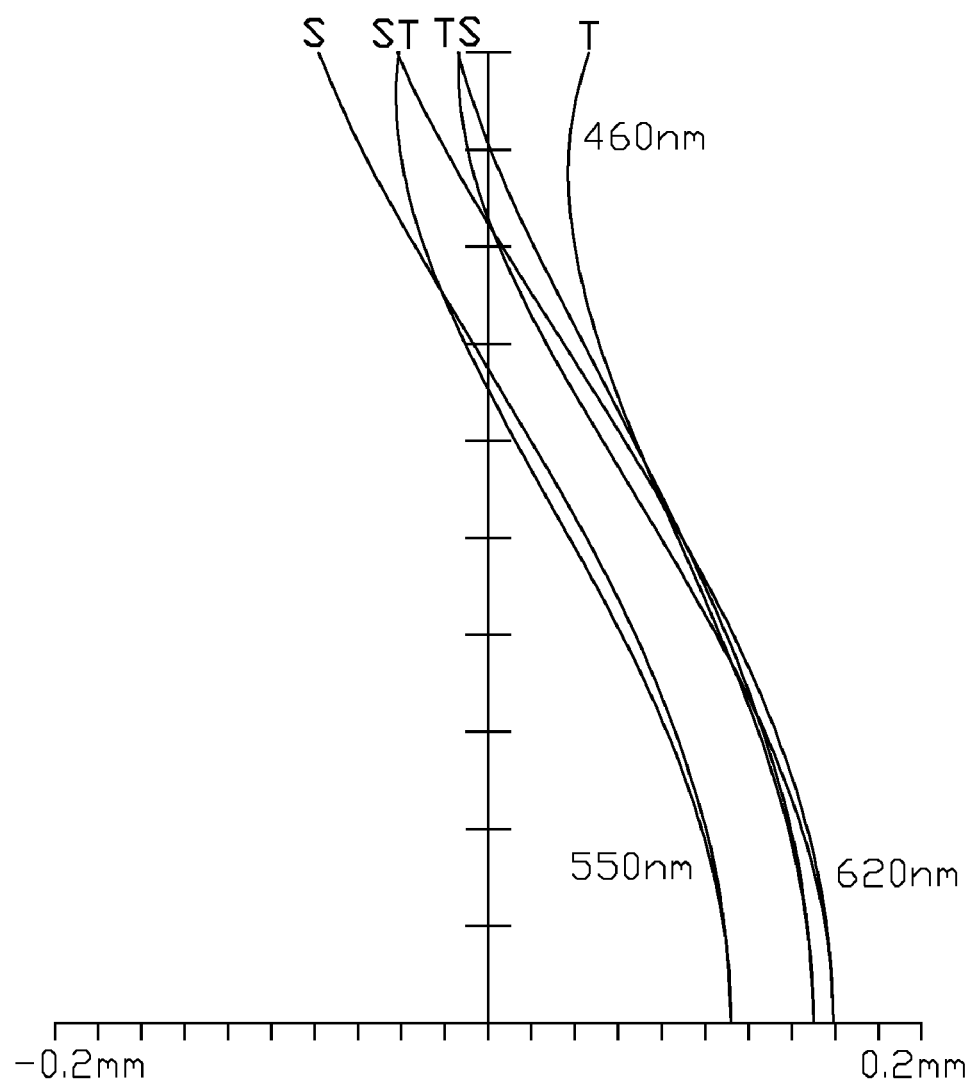
Figure 17:
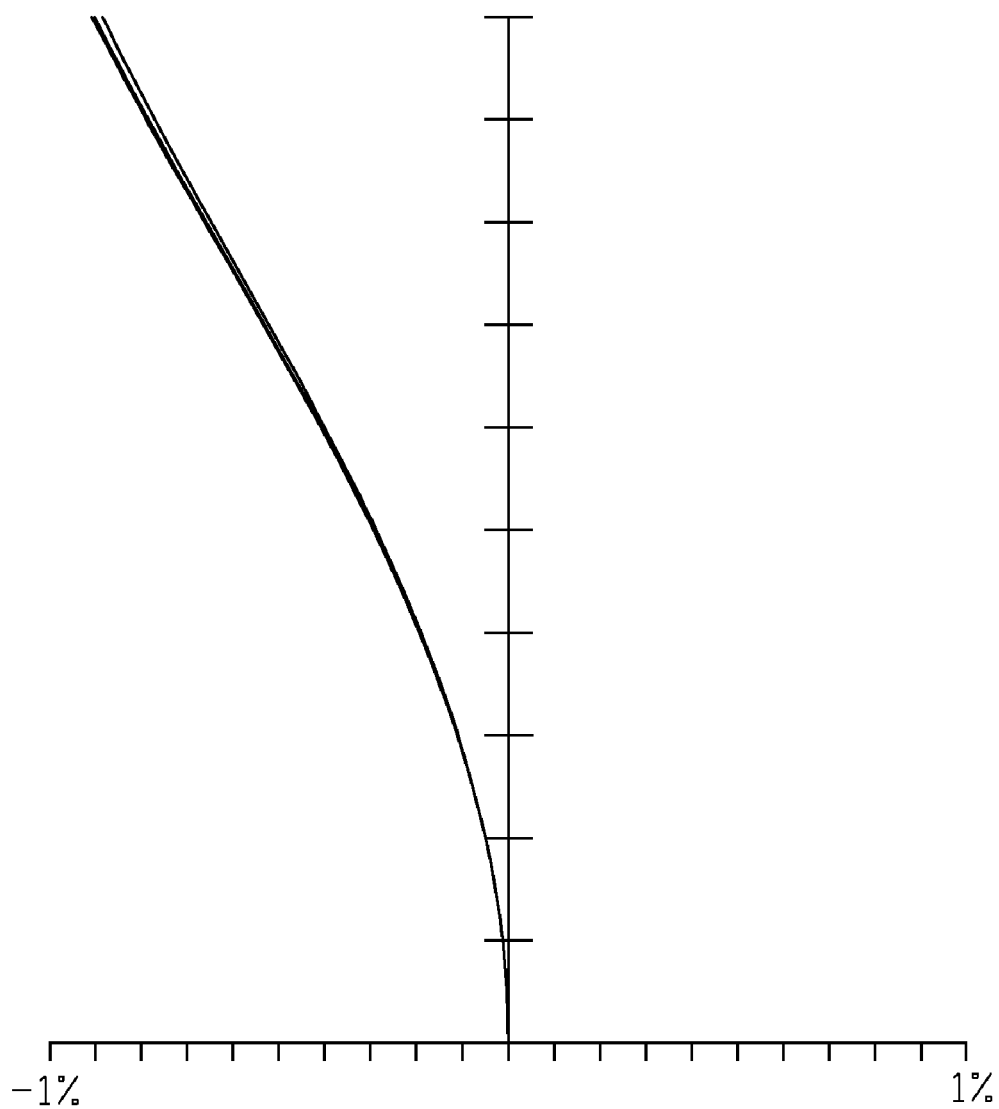
Figure 18:
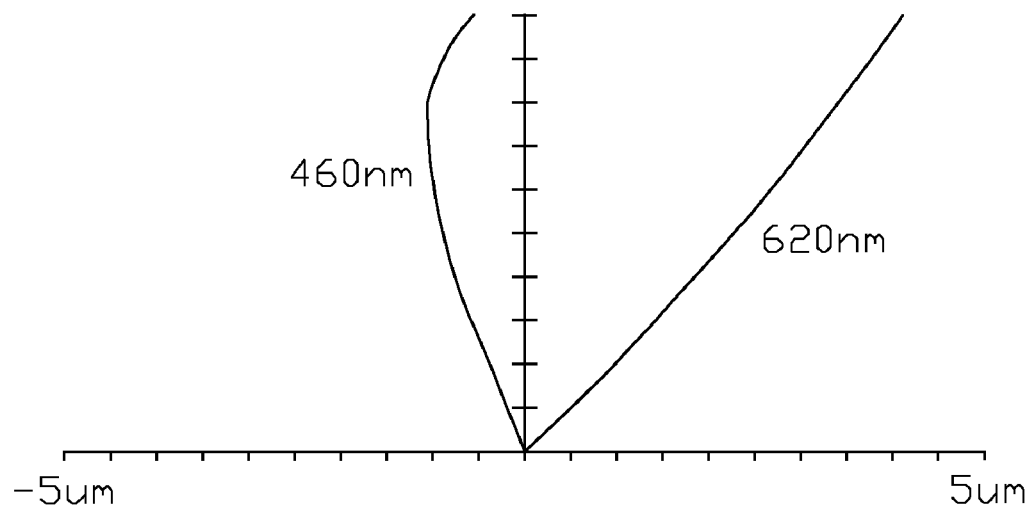
Figure 19:
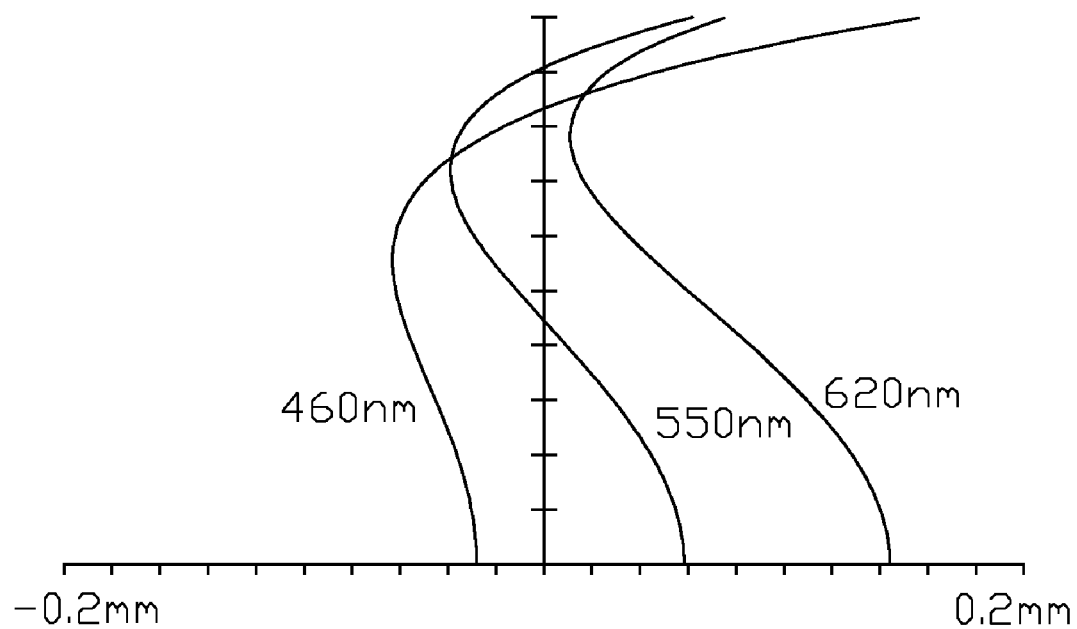
FIGS. 19-22 are graphs respectively showing spherical aberration, field curvature, distortion, and lateral chromatic aberration occurring in the projection lens that is in the wide-angle state as in FIG. 1, according to a fourth embodiment.
Figure 20:
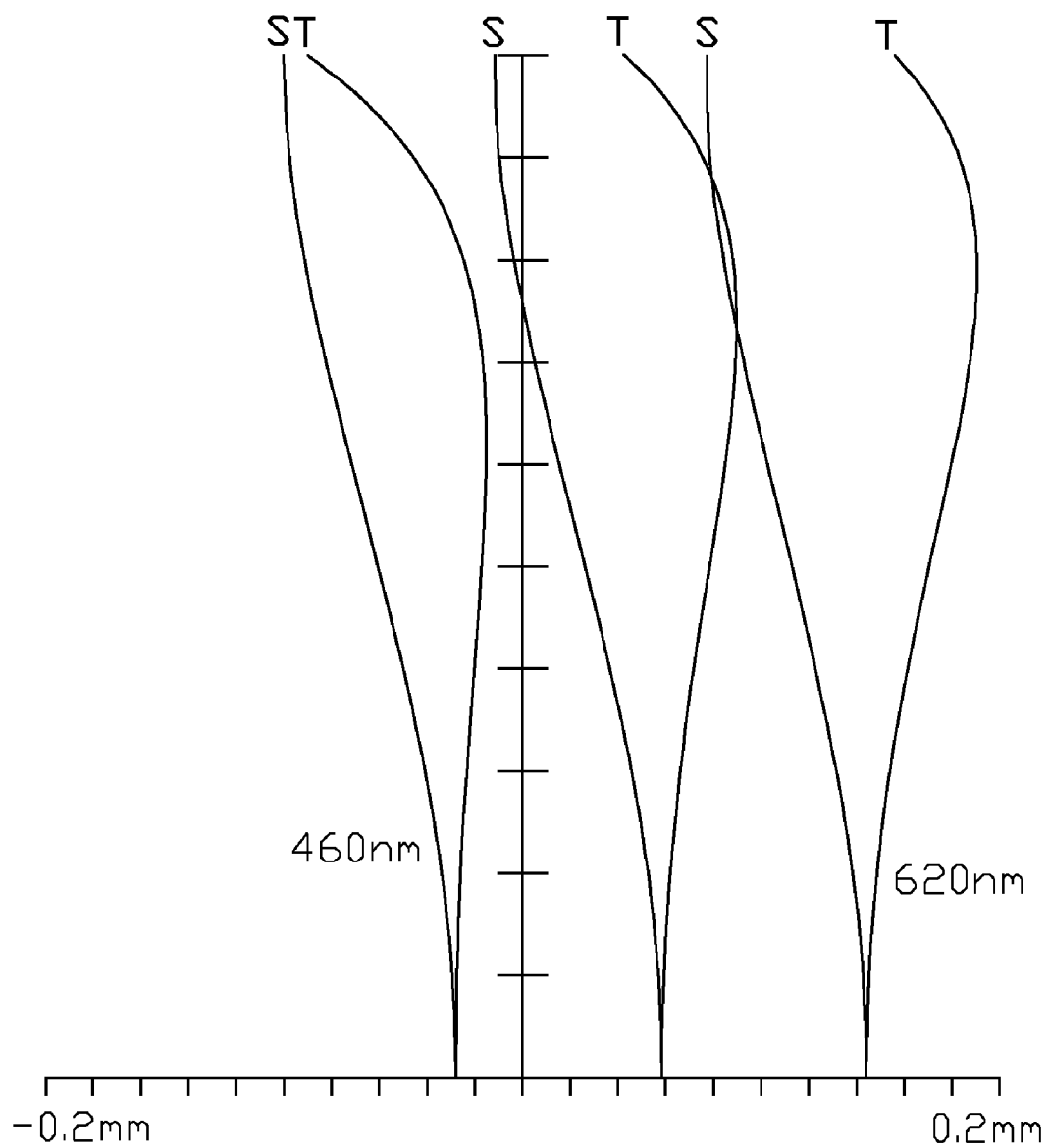
Figure 21:
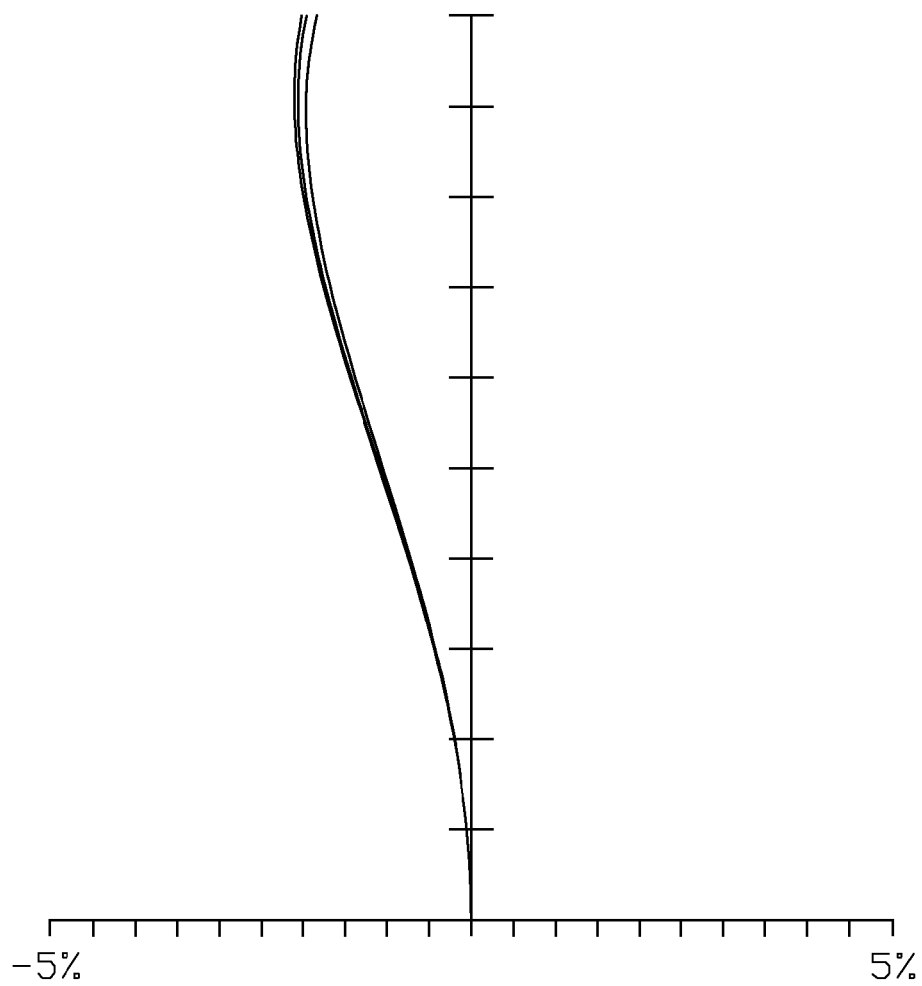
Figure 22:
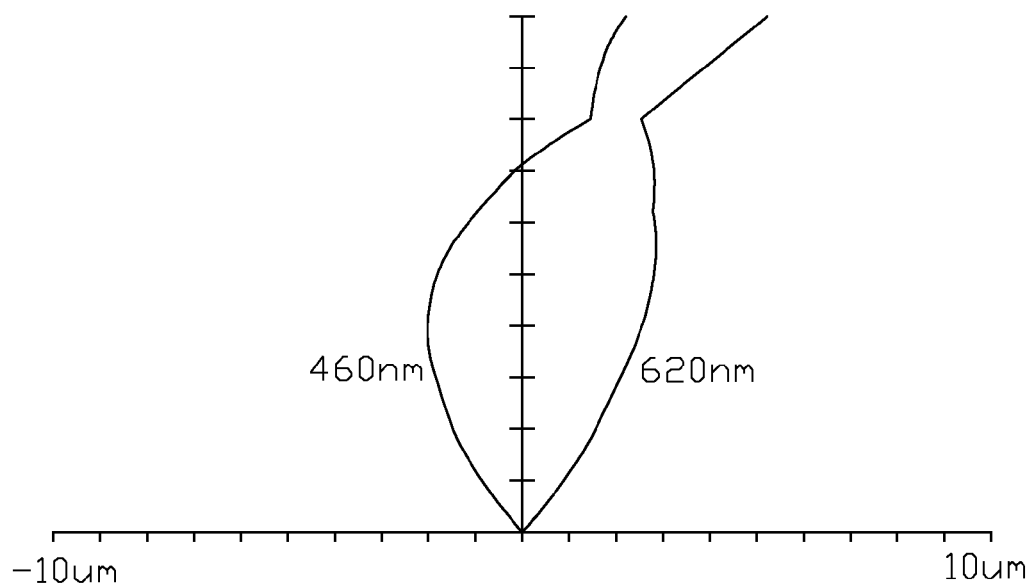
Figure 23:
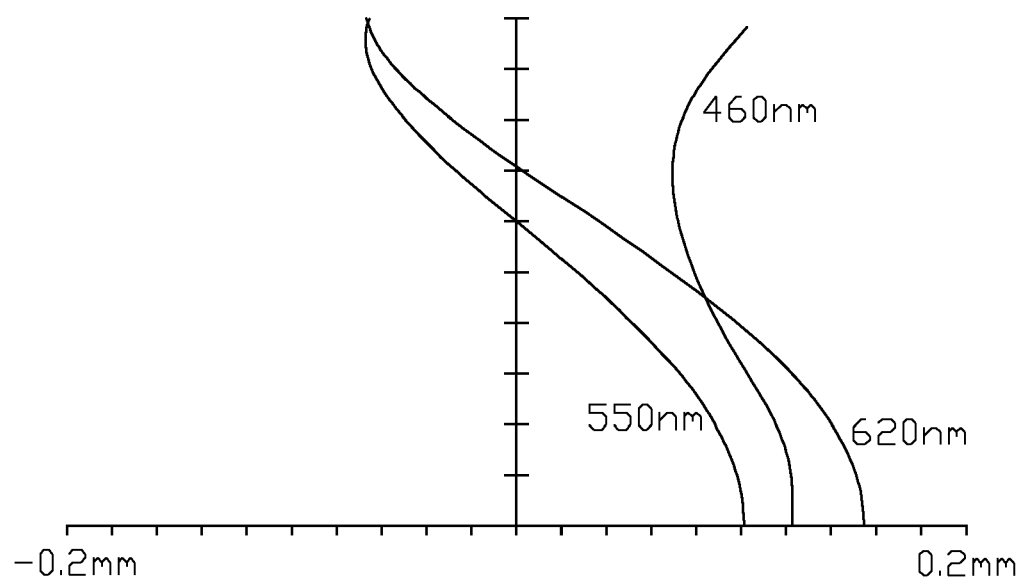
FIGS. 23-26 are graphs respectively showing spherical aberration, field curvature, distortion, and lateral chromatic aberration occurring in the projection lens in the telephoto state as in FIG. 2, according to the fourth embodiment.
Figure 24:
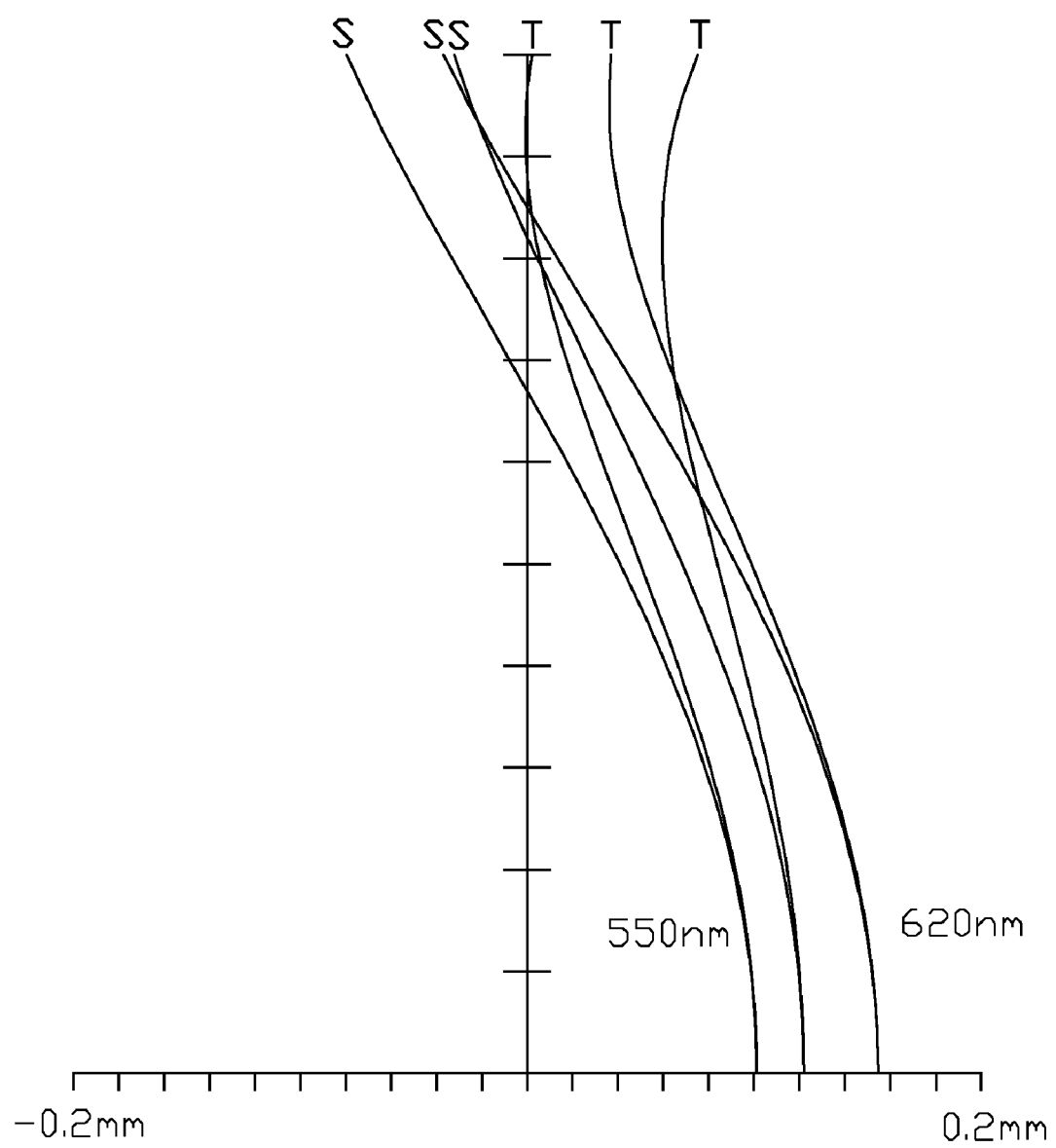
Figure 25:
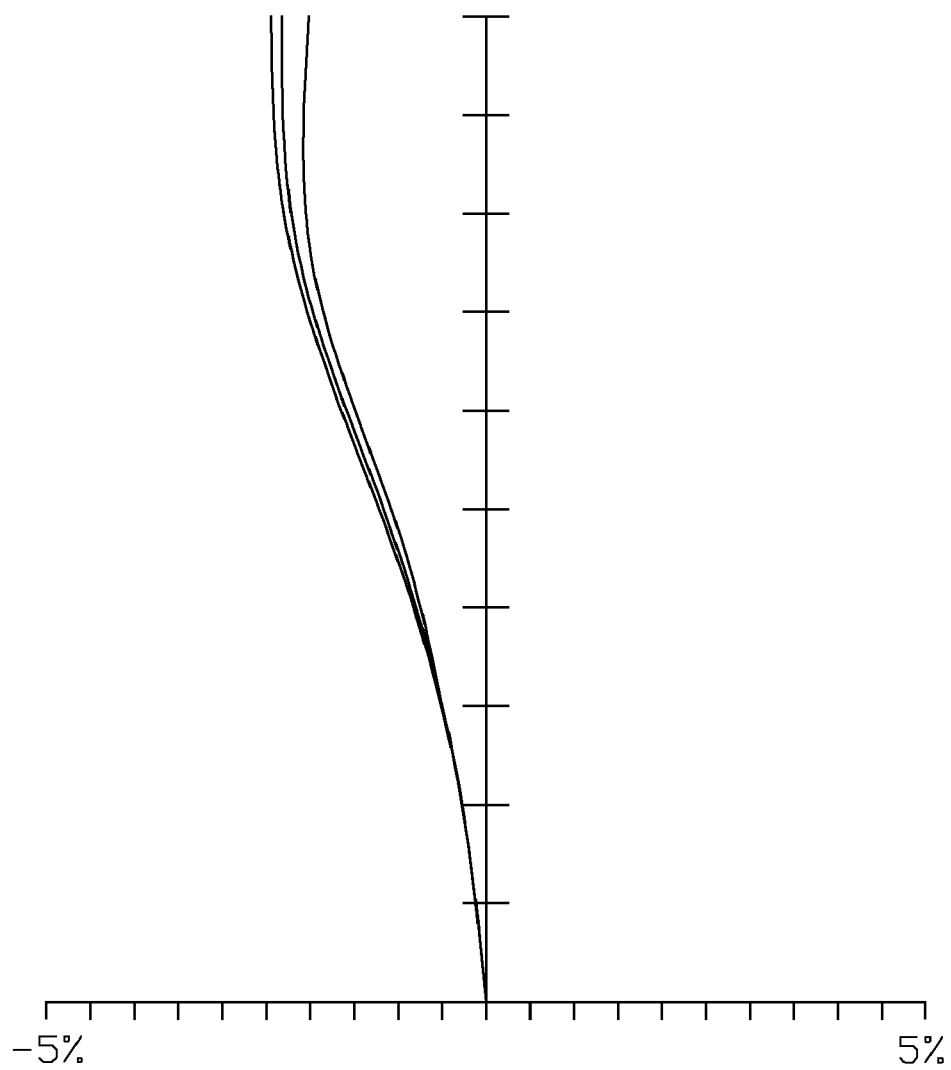
Figure 26:
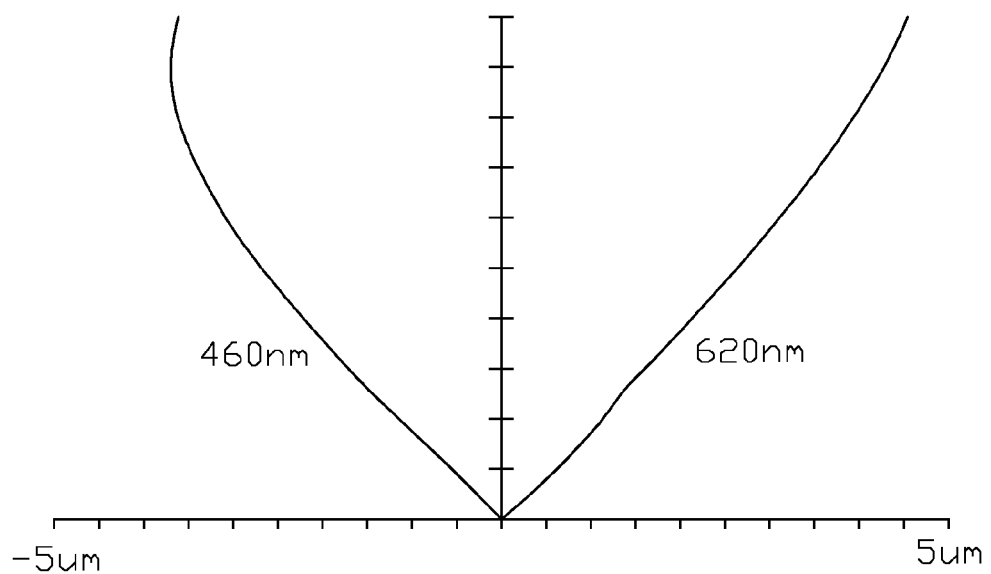

In FIGS. 3 and 7, spherical aberration characteristic curves of 460 nm, 550 nm, and 620 nm light occurring in the projection lens 100 of Example 1 are shown. The spherical aberration occurring in the projection lens 100 of Example 1 is limited to be in a range of: −0.2 mm~0.2 mm. In FIGS. 4 and 8, the curves t and s are the tangential field curvature curve and the sagittal field curvature curve respectively. Field curvature occurring in the projection lens 100 of Example 1 is limited to a range of: −0.2 mm~0.2 mm. In FIGS. 5 and 9, distortion occurring in the projection lens 100 of Example 1 is limited to be within the range of: −2.5%~2.5%. In FIGS. 6 and 10, characteristic curves of lateral chromatic aberration of 460 nm, and 620 nm light occurring in the projection lens 100 of Example 1 are shown. The lateral chromatic aberration occurring in the projection lens 100 of Example 1 is limited to a range of: −7(micron, um)~7 um.

EXAMPLE 2

Table 2 shows the lens data of Example 2, where EFL(W)=16 mm, EFL(T)=25.6 mm, $F_{No}$=2.64(W)~3.44(T), EFL1=−28.43 mm, EFL2=26.53 mm, Φ1=−0.035, Φ2=0.037, BFL(W)=27.16 mm, BFL(T)=36.28 mm, TTI(W)=100 mm, and TTI(T)=91.44 mm. As such, Φ1/Φ2=−0.93, EFL1/EFL(W)=−1.78, EFL2/EFL(W)=1.66, EFL1/EFL(T)=−1.11, EFL2/EFL(T)=1.04, EFL(W)/BFL(W)=0.59, EFL(T)/BFL(T)=0.71, TTI(W)/EFL(W)=6.25, and TTI(T)/EFL(T)=3.57.

TABLE 1

| Surface | R (mm) | D (mm) | Nd | V |
|---|---|---|---|---|
| Screen | — | 1700 | — | — |
| Screen-side surface of the first lens 11 | 59.35138 | 6.61506 | 1.487489 | 70.44113 |
| SLM-side surface of the first lens 11 | 389.1105 | 0.1 | — | — |
| Screen-side surface of the second lens 12 | 33.00573 | 1.4 | 1.834807 | 43.71367 |
| SLM-side surface of the second lens 12 | 16.68746 | 7.522747 | — | — |
| Screen-side surface of the third lens 13 | 8414.742 | 1.4 | 1.834807 | 42.71367 |
| SLM-side surface of the third lens 13 | 22.17334 | 7.227141 | — | — |
| Screen-side surface of the fourth lens 14 | 29.10951 | 3.224321 | 1.805181 | 25.45642 |
| SLM-side surface of the fourth lens 14 | 61.82606 | 20.33(W)~2.9(T) | — | — |
| Screen-side surface of the fifth lens 21 | 134.7065 | 2.945785 | 1.834807 | 42.71367 |
| SLM-side surface of the fifth lens 21 | −48.1397 | 0.1 | — | — |
| Screen-side surface of the sixth lens 22 | 22.05425 | 2.349194 | 1.834 | 37.34505 |
| SLM-side surface of the sixth lens 22 | 36.56741 | 3.343024 | — | — |
| Screen-side surface of the seventh lens 23 | −27.681 | 5.910529 | 1.71736 | 29.5005 |
| SLM-side surface of the seventh lens 23 | −42.0079 | 1.651311 | — | — |
| Screen-side surface of the eighth lens 24 | 33.66178 | 2.385555 | 1.66672 | 48.29731 |
| SLM-side surface of the eighth lens 24 (or screen-side surface of the ninth lens 25) | −33.6618 | 1.4 | 1.846663 | 23.78481 |
| SLM-side surface of the ninth lens 25 | 21.55219 | 1.003401 | — | — |
| Screen-side surface of the tenth lens 26 | −110.303 | 1.78602 | 1.834807 | 42.71367 |
| SLM-side surface of the tenth lens 26 | −36.7997 | 0.1 | — | — |
| Screen-side surface of the eleventh lens 27 | −992.391 | 2.042137 | 1.834807 | 42.71367 |
| SLM-side surface of the eleventh lens 27 | −34.8115 | 25(W)~33.68(T) | — | — |
| Screen-side surface of the cover glass 98 | Infinite | 1.05 | 1.5068 | 63.35 |
| SLM-side surface of the cover glass 98 | Infinite | 1.11 | — | — |
| Surface 99 | Infinite | — | — | — |

TABLE 2

| Surface | R (mm) | D (mm) | Nd | V |
|---|---|---|---|---|
| Screen | — | 1700 | — | — |
| Screen-side surface of the first lens 11 | 83.89034 | 4.530306 | 1.496999 | 81.54589 |
| SLM-side surface of the first lens 11 | −39472.72 | 0.15 | — | — |
| Screen-side surface of the second lens 12 | 32.36923 | 1.6 | 1.650996 | 56.16372 |
| SLM-side surface of the second lens 12 | 17.38249 | 7.301365 | — | — |
| Screen-side surface of the third lens 13 | 347.6979 | 1.45 | 1.882997 | 40.76511 |
| SLM-side surface of the third lens 13 | 21.92383 | 10.79018 | — | — |
| Screen-side surface of the fourth lens 14 | 28.31657 | 1.993376 | 1.92286 | 18.89691 |
| SLM-side surface of the fourth lens 14 | 39.11825 | 19.72572(W)~2.04975(T) | — | — |
| Screen-side surface of the fifth lens 21 | 83.46944 | 1.986532 | 1.785896 | 44.20264 |

TABLE 2-continued

| Surface | R (mm) | D (mm) | Nd | V |
|---|---|---|---|---|
| SLM-side surface of the fifth lens 21 | −98.26083 | 0.15 | — | — |
| Screen-side surface of the sixth lens 22 | 27.91382 | 2.535763 | 1.834807 | 42.71367 |
| SLM-side surface of the sixth lens 22 | 489.0707 | 2.097901 | — | — |
| Screen-side surface of the seventh lens 23 | −55.78423 | 5.591877 | 1.84666 | 23.77794 |
| SLM-side surface of the seventh lens 23 | Infinite | 4.89528 | — | — |
| Screen-side surface of the eighth lens 24 | −206.7472 | 1.45 | 1.756998 | 47.82317 |
| SLM-side surface of the eighth lens 24 (or screen-side surface of the ninth lens 25) | −34.31424 | 2.04218 | 1.784723 | 25.68345 |
| SLM-side surface of the ninth lens 25 | 23.89549 | 0.888141 | — | — |
| Screen-side surface of the tenth lens 26 | 320.1188 | 1.45 | 1.756998 | 47.82317 |
| SLM-side surface of the tenth lens 26 | −45.56951 | 0.15 | — | — |
| Screen-side surface of the eleventh lens 27 | 49.49416 | 2.061378 | 1.693495 | 50.81065 |
| SLM-side surface of the eleventh lens 27 | −37.53172 | 25(W)~34.12(T) | — | — |
| Screen-side surface of the cover glass 98 | Infinite | 1.05 | 1.5068 | 63.35 |
| SLM-side surface of the cover glass 98 | Infinite | 1.11 | — | — |
| Surface 99 | Infinite | — | — | — |

As illustrated in FIGS. 11~18, spherical aberration occurring in the projection lens 100 of Example 2 is limited to a range of: −0.2 mm~0.2 mm, field curvature occurring in the projection lens 100 of Example 2 is limited to a range of: −0.2 mm~0.2 mm, distortion occurring in the projection lens 100 of Example 2 is limited to the range of: −2.5%~2.5%, lateral chromatic aberration occurring in the projection lens 100 of Example 2 is limited to a range of: −7 um~7 um.

EXAMPLE 3

Table 3 shows the lens data of Example 3, where EFL(W)=15.9 mm, EFL(T)=25.44 mm, $F_{No}$=2.42(W)~3.05(T), EFL1=−28.89 mm, EFL2=25.67 mm, Φ1=−0.063, Φ2=0.039, BFL(w)=27.16 mm, BFL(T)=35.84 mm, TTI(W)=100 mm, and TTI(T)=91.25 mm. As such, Φ1=−1.6, EFL1/EFL(W)=−1.82, EFL2/EFL(W)=1.61, EFL1/EFL(T)=−1.14, EFL2/EFL(T)=1.01, EFL(W)/BFL(W)=0.585, EFL(T)/BFL(T)=0.709, TTI(W)/EFL(w)=6.29, TTI(T)/EFL(T)=3.59.

TABLE 3

| Surface | R (mm) | D (mm) | Nd | V |
|---|---|---|---|---|
| Screen | — | 1700 | — | — |
| Screen-side surface of the first lens 11 | 62.13122 | 6.61506 | 1.496999 | 81.54589 |
| SLM-side surface of the first lens 11 | 416.8309 | 0.1 | — | — |
| Screen-side surface of the second lens 12 | 31.41843 | 1.4 | 1.834807 | 42.71367 |
| SLM-side surface of the second lens 12 | 16.35052 | 7.522747 | — | — |
| Screen-side surface of the third lens 13 | −1595.621 | 1.4 | 1.834807 | 42.71367 |
| SLM-side surface of the third lens 13 | 22.45833 | 7.227141 | — | — |
| Screen-side surface of the fourth lens 14 | 29.05183 | 3.224321 | 1.805181 | 25.45642 |
| SLM-side surface of the fourth lens 14 | 61.69639 | 20.33(W)~2.9(T) | — | — |
| Screen-side surface of the fifth lens 21 | 127.0945 | 2.945785 | 1.834807 | 42.71367 |
| SLM-side surface of the fifth lens 21 | −49.31761 | −49.31761 | — | — |
| Screen-side surface of the sixth lens 22 | 21.98249 | 2.349194 | 1.834 | 37.34505 |
| SLM-side surface of the sixth lens 22 | 36.48197 | 3.343024 | — | — |
| Screen-side surface of the seventh lens 23 | −27.82465 | 5.910529 | 1.71736 | 29.5005 |
| SLM-side surface of the seventh lens 23 | −42.33013 | 1.651311 | — | — |
| Screen-side surface of the eighth lens 24 | 34.3971 | 2.385555 | 1.66672 | 48.29731 |
| SLM-side surface of the eighth lens 24 (or screen-side surface of the ninth lens 25) | −34.3971 | 1.4 | 1.846663 | 23.78481 |
| SLM-side surface of the ninth lens 25 | 21.61163 | 1.003401 | — | — |
| Screen-side surface of the tenth lens 26 | −102.2005 | 1.78602 | 1.834807 | 42.71367 |
| SLM-side surface of the tenth lens 26 | −35.74867 | 0.1 | — | — |
| Screen-side surface of the eleventh lens 27 | 2181.171 | 2.042137 | 1.834807 | 42.71367 |
| SLM-side surface of the eleventh lens 27 | −36.47281 | 25(W)~33.679(T) | — | — |
| Screen-side surface of the cover glass 98 | Infinite | 1.05 | 1.5068 | 63.35 |
| SLM-side surface of the cover glass 98 | Infinite | 1.11 | — | — |
| Surface 99 | Infinite | — | — | — |

As illustrated in FIGS. 19~26, spherical aberration occurring in the projection lens 100 of Example 3 is limited to a range of: −0.2 mm~0.2 mm, field curvature occurring in the projection lens 100 of Example 3 is limited to a range of: −0.2 mm~0.2 mm, distortion occurring in the projection lens 100 of Example 3 is limited to a range of: −2.5%~2.5%, lateral chromatic aberration occurring in the projection lens 100 of Example 2 is limited to a range of: −6 um~6 um.

In all, in Examples 1~3, though the overall length of the projection lens 100 is reduced, the resolution of the projection lens 100 is maintained, even improved, since aberrations occurring in the projection lens 100 are controlled to be in an acceptable range.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A projection lens with a variable effective focal length comprising, in the order from the screen-side to the SLM-side thereof,
a negative lens group; and
a positive lens group;
wherein the projection lens satisfies the formulas of: $-2<\Phi 1/\Phi 2<-0.5$, $-2<EFL1/EFL(W)<-1.5$, $1.5<EFL2/EFL(W)<1.75$, $-1.2<EFL1/EFL(T)<-1$, $0.8<EFL2/EFL(T)<1.2$, $0.5<EFL(W)/BFL(W)<0.6$, $0.68<EFL(T)/BFL(T)<0.75$, $6.2<TTL(W)/EFL(W)<6.5$, and $3.5<TTL(T)/EFL(T)<3.6$; where $\Phi 1$ and $\Phi 2$ represent refractive powers of the negative lens group and the positive lens group respectively, EFL(W) and EFL(T) represent effective focal lengths of the projection lens when the projection lens is in the wide-angle state and in the telephoto state respectively, EFL1 and EFL2 represent effective focal lengths of the negative lens group and the positive lens group respectively, TTL(W) and TTL(T) represent overall lengths of the projection lens when the projection lens is in the wide-angle state and in the telephoto state respectively, and BFL(W) and BFL(T) represent rear focal lengths of the projection lens when the projection lens is in the wide-angle state and in the telephoto state respectively.

2. The projection lens of claim 1, wherein the negative lens group is movable along the optical axis of the projection lens.

3. The projection lens of claim 1, wherein the positive lens group is movable along the optical axis of the projection lens.

4. The projection lens of claim 1, wherein the negative lens group comprises, in the order from the screen-side to the SLM-side of the projection lens, a positive first lens, a negative second lens, a negative third lens, and a positive fourth lens.

5. The projection lens of claim 1, wherein the positive lens group comprises, in the order from the screen-side to the SLM-side of the projection lens, a positive fifth lens, a positive sixth lens, a negative seventh lens, a positive eighth lens, and a positive ninth lens, a positive tenth lens, and a positive eleventh lens.

6. The projection lens of claim 5, wherein the eighth lens and the ninth lens are combined.

7. The projection lens of claim 5, further comprising an aperture stop interposed between the seventh lens and the eighth lens.

8. The projection lens of claim 7, wherein the aperture stop is an opaque layer disposed on the eighth lens.

* * * * *